United States Patent
Hatta

(10) Patent No.: US 11,148,351 B2
(45) Date of Patent: Oct. 19, 2021

(54) MANUFACTURING METHOD FOR TANK

(71) Applicant: TOYOTA JIDOSHA KABUSHIKI KAISHA, Toyota (JP)

(72) Inventor: Ken Hatta, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/799,388

(22) Filed: Feb. 24, 2020

(65) Prior Publication Data

US 2020/0282633 A1    Sep. 10, 2020

(30) Foreign Application Priority Data

Mar. 7, 2019    (JP) .............................. JP2019-041132

(51) Int. Cl.
*B29C 63/00*    (2006.01)
*B29L 31/00*    (2006.01)
*B29K 101/10*    (2006.01)

(52) U.S. Cl.
CPC ...... *B29C 63/0069* (2013.01); *B29C 63/0021* (2013.01); *B29K 2101/10* (2013.01); *B29K 2995/0005* (2013.01); *B29L 2031/712* (2013.01)

(58) Field of Classification Search
None
See application file for complete search history.

(56) References Cited

U.S. PATENT DOCUMENTS

| | | | | |
|---|---|---|---|---|
| 2,669,647 A | * | 2/1954 | Segsworth | H05B 6/02 219/656 |
| RE27,973 E | * | 4/1974 | Pennington et al. | B29C 53/845 156/175 |
| 4,093,839 A | * | 6/1978 | Moliterno | H05B 6/104 219/643 |
| 2018/0281240 A1 | * | 10/2018 | Hatta | B29C 35/002 |

FOREIGN PATENT DOCUMENTS

| | | |
|---|---|---|
| JP | 2012148544 A | 8/2012 |
| JP | 2013103395 A | 5/2013 |
| JP | 2013163305 A | 8/2013 |

OTHER PUBLICATIONS

Machine translation of Japanese Patent 2013-163305, date unknown.*

* cited by examiner

*Primary Examiner* — Jeffry H Aftergut
(74) *Attorney, Agent, or Firm* — Dickinson Wright, PLLC

(57) ABSTRACT

A manufacturing method for a high-pressure tank is a manufacturing method for a high-pressure tank including a reinforced layer formed such that an electrically conductive fiber bundle impregnated with thermosetting resin is wound around a liner. The manufacturing method includes: a step of preparing the tank in which the uncured reinforced layer is formed on the liner; a first heating step of heating the uncured reinforced layer by low-frequency induction heating so the thermosetting resin is softened; and a second heating step of, after the first heating step, heating the softened reinforced layer by high-frequency induction heating so that the softened reinforced layer is hardened.

4 Claims, 5 Drawing Sheets

MANUFACTURING METHOD FOR TANK

INCORPORATION BY REFERENCE

The disclosure of Japanese Patent Application No. 2019-041132 filed on Mar. 7, 2019 including the specification, drawings and abstract is incorporated herein by reference in its entirety.

BACKGROUND

1. Technical Field

The present disclosure relates to a manufacturing method for a tank including a fiber reinforced resin layer formed such that a fiber bundle is wound around a liner.

2. Description of Related Art

In the related art, there has been known a tank including a tank body and a mouth piece portion attached to an open end portion of the tank body in its longitudinal direction, as a high-pressure tank (a high-pressure gas storage container) used for storage and supply of hydrogen or the like. The tank body has a two-layer structure constituted by, for example, a liner in which hydrogen gas is held airtightly, and a fiber reinforced resin layer reinforced by winding a fiber bundle made of carbon fiber reinforced plastics (CFRP) around an outer peripheral surface of the liner.

As a manufacturing method for the high-pressure tank, there has been known a method in which an uncured fiber reinforced resin layer is formed by winding a fiber bundle around an outer periphery of a liner by a filament winding method (hereinafter also just referred to as "FW method"), and after that, the fiber reinforced resin layer is hardened by heating, for example. As a heating method for the fiber reinforced resin layer, there are various heating methods such as hot-air blasting, heating by an electric heater, or induction heating. By use of the induction heating, the temperature of the fiber reinforced resin layer can be raised immediately.

Note that a tank manufacturing method in which a fiber reinforced resin layer is hardened by heating the fiber reinforced resin layer by induction heating is described in Japanese Unexamined Patent Application Publication No. 2013-103395 (JP 2013-103395 A), for example.

SUMMARY

However, in a case where the fiber reinforced resin layer is hardened by heating the fiber reinforced resin layer by induction heating, when the amount of thermosetting resin seeping from an outermost layer of the fiber reinforced resin layer increases, the volume fraction of fiber (hereinafter also referred to as Vf) of the fiber reinforced resin layer rises. This causes variations in Vf or a strength reduction in the tank. Further, in a case where air or gas in the fiber reinforced resin layer is hard to be released outside at the time when the fiber reinforced resin layer is hardened by heating, voids are formed inside the fiber reinforced resin layer, thereby causing a poor appearance and a decrease in quality.

The present disclosure is accomplished in view of such points, and an object of the present disclosure is to provide a manufacturing method for a tank that can restrain an increase in the volume fraction of fiber of a fiber reinforced resin layer and restrain voids from being formed inside the fiber reinforced resin layer.

In view of such points, a manufacturing method for a tank according to the present disclosure is a manufacturing method for a tank including a fiber reinforced resin layer formed such that an electrically conductive fiber bundle impregnated with thermosetting resin is wound around a liner. The manufacturing method includes: a step of preparing the tank in which the uncured fiber reinforced resin layer is formed on the liner; a first heating step of heating the uncured fiber reinforced resin layer by low-frequency induction heating so that the thermosetting resin is softened; and a second heating step of, after the first heating step, heating the softened fiber reinforced resin layer by high-frequency induction heating so that the fiber reinforced resin layer is hardened.

The manufacturing method of the present disclosure includes the first heating step of heating the uncured fiber reinforced resin layer by the low-frequency induction heating so that the thermosetting resin is softened. In a case where the fiber reinforced resin layer is heated by the low-frequency induction heating as such, an inner layer of the fiber reinforced resin layer is easily heated. This allows air and gas in the inner layer of the fiber reinforced resin layer to be easily released outside the fiber reinforced resin layer. As a result, it is possible to restrain voids from being formed inside the fiber reinforced resin layer, thereby making it possible to restrain a poor appearance and a decrease in quality. Note that, when the uncured fiber reinforced resin layer is heated only by the high-frequency induction heating without the low-frequency induction heating after the step of preparing the tank in which the uncured fiber reinforced resin layer is formed on the liner, an outermost layer of the fiber reinforced resin layer hardens, so that the air and the gas in the inner layer are hard to be released outside, thereby resulting in that voids are formed inside the fiber reinforced resin layer.

Further, the second heating step of heating the softened fiber reinforced resin layer by the high-frequency induction heating so that the fiber reinforced resin layer is hardened is provided after the first heating step. In a case where the fiber reinforced resin layer is heated by the high-frequency induction heating as such, an outer layer (the outermost layer in particular) of the fiber reinforced resin layer is easily heated. Accordingly, the outer layer (the outermost layer in particular) of the fiber reinforced resin layer can be hardened earlier than the inner layer, thereby making it possible to restrain the thermosetting resin from seeping from the outermost layer of the fiber reinforced resin layer. As a result, it is possible to restrain variations in the volume fraction of fiber of the fiber reinforced resin layer and to restrain a strength reduction in the tank due to an increase in the volume fraction of fiber. Note that, in a case where the fiber reinforced resin layer is hardened by heating the fiber reinforced resin layer by the low-frequency induction heating, a timing for the outer layer of the fiber reinforced resin layer to harden delays (the outer layer of the fiber reinforced resin layer does not harden earlier than the inner layer) in comparison with a case where the fiber reinforced resin layer is hardened by heating the fiber reinforced resin layer by the high-frequency induction heating. Consequently, the amount of the thermosetting resin seeping from the outermost layer of the fiber reinforced resin layer increases.

In the manufacturing method, the first heating step may be switched to the second heating step at a timing when an innermost layer of the fiber reinforced resin layer reaches a hardening starting temperature. When the first heating step is performed by the low-frequency induction heating until the innermost layer of the fiber reinforced resin layer reaches the hardening starting temperature, the air and the gas in the inner layer of the fiber reinforced resin layer can be further easily released outside the fiber reinforced resin layer. Further, by performing the second heating step by the high-frequency induction heating at the timing when the innermost layer of the fiber reinforced resin layer reaches the hardening starting temperature, it is possible to restrain the thermosetting resin from seeping from the outermost layer of the fiber reinforced resin layer. As described above, while the thermosetting resin is restrained from seeping, the air and the gas in the inner layer of the fiber reinforced resin layer can be further easily released.

In the manufacturing method, in the first heating step, an innermost layer and an outermost layer of the fiber reinforced resin layer may be maintained at a temperature of not less than a melting point of the thermosetting resin but less than a hardening starting temperature for a predetermined time. With this configuration, it is possible to maintain the innermost layer and the outermost layer of the fiber reinforced resin layer in a low viscosity state for the predetermined time, thereby making it possible to surely release the air and the gas in the fiber reinforced resin layer to outside. As a result, it is possible to further restrain voids from being formed inside the fiber reinforced resin layer.

With the present disclosure, it is possible to provide a manufacturing method for a tank that can restrain an increase in the volume fraction of fiber of a fiber reinforced resin layer and restrain voids from being formed inside the fiber reinforced resin layer.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

With reference to drawings, the following describes a manufacturing method for a high-pressure tank 10 according to an embodiment of the present disclosure. Note that the high-pressure tank 10 is one example of a "tank" in the present disclosure.

Figure 1A:
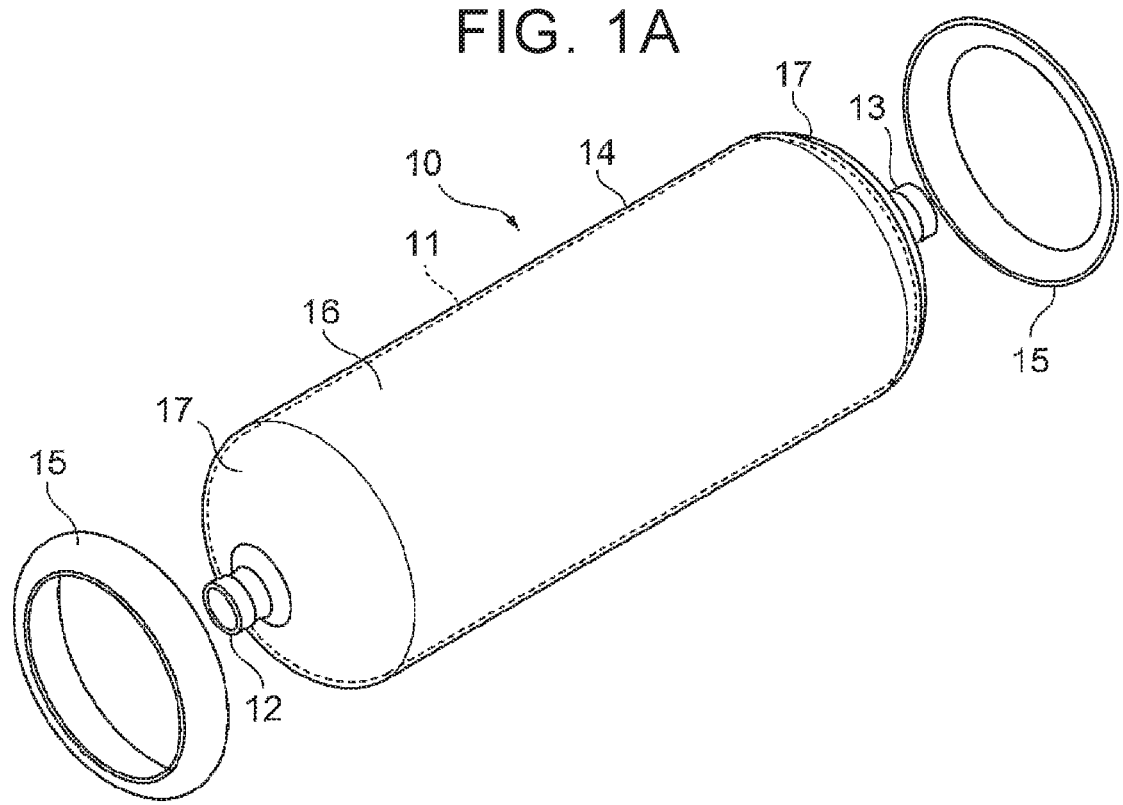
FIG. 1A is a view illustrating a high-pressure tank manufactured by a manufacturing method according to one embodiment of the present disclosure and illustrates an exploded perspective view of the high-pressure tank.
Figure 1B:
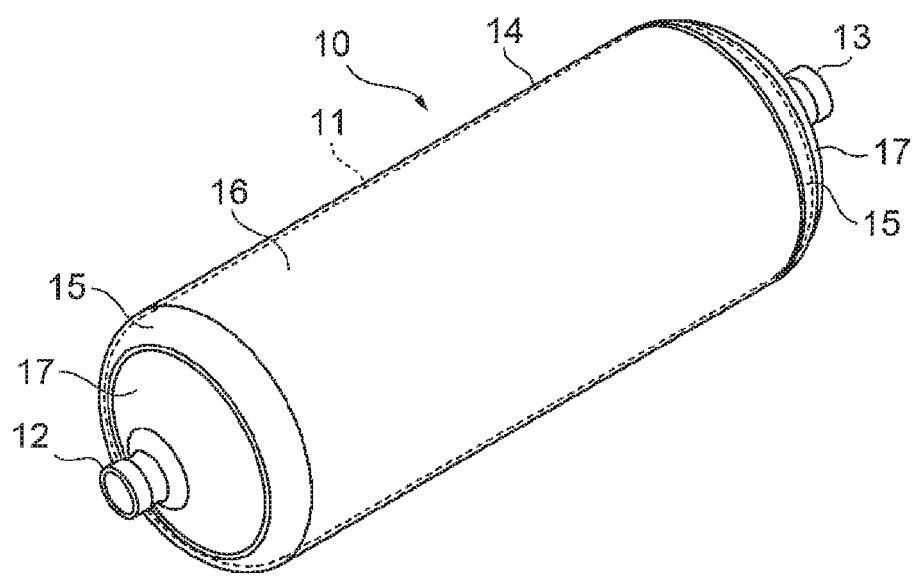
FIG. 1B is a view illustrating the high-pressure tank manufactured by the manufacturing method according to one embodiment of the present disclosure and illustrates a perspective view of the high-pressure tank.

First described is the configuration of the high-pressure tank 10. As illustrated in FIGS. 1A, 1B, the high-pressure tank 10 is constituted by a liner 11, mouth pieces 12, 13, a reinforced layer (fiber reinforced resin layer) 14 formed on an outer peripheral surface of the liner 11, and a pair of caps 15. The high-pressure tank 10 has such a property that gas hardly passes through the high-pressure tank 10, i.e., a so-called gas barrier property, and is configured such that relatively high-pressure gas such as hydrogen is to be filled inside the high-pressure tank 10.

The liner 11 is constituted by a tubular hollow container and made of resin having a gas barrier property. A resin material of the liner 11 can be, for example, thermoplastic resin such as polyethylene, polypropylene, nylon polyamide, or an ethylene vinyl alcohol copolymer. Note that the liner 11 may be made of a metallic material such as aluminum or stainless steel.

The liner 11 includes a cylinder portion 16 and a pair of dome portions 17. The cylinder portion 16 is formed in a cylindrical shape. Each of the dome portions 17 is constituted by a generally hemispherical body having a hollow and is formed integrally with the cylinder portion 16. The dome portions 17 include respective mouth piece attachment portions (not shown), so that the mouth pieces 12, 13 are attached to the mouth piece attachment portions, respectively.

The mouth piece 12 is made of a metallic material and projects in the axis direction of the liner 11 from the dome portion 17 formed in a generally hemispherical shape. Similarly to the mouth piece 12, the mouth piece 13 is made of a metallic material and projects in the axis direction of the liner 11 from the dome portion 17 formed in a generally hemispherical shape.

The caps 15 are made of shock absorbing resin having a porous structure. Examples of the shock absorbing resin having a porous structure include rubber materials such as urethane rubber, nitrile rubber, and fluororubber.

The reinforced layer 14 is formed such that a fiber bundle F is wound around the outer peripheral surface of the liner 11. The fiber bundle F is made of reinforced fiber impregnated with uncured thermosetting resin. In the present embodiment, examples of the reinforced fiber include fiber having conductivity, e.g., carbon fiber, boron fiber, and steel fiber. Note that a layer formed such that fiber such as glass fiber, aramid fiber (aromatic polyamide fiber), PBO fiber, natural fiber, or high-strength polyethylene fiber is put in plastic to improve strength may be further provided on an outermost layer of the reinforced layer 14 as a protection layer.

Further, examples of the thermosetting resin include modified epoxy resin represented by epoxy based resin and vinyl ester resin, phenolic resin, melamine resin, urea resin, unsaturated polyester resin, alkyd resin, polyurethane resin, and thermosetting polyimide resin. Note that the thermosetting resin with which the fiber bundle F is impregnated is set such that a hardening starting temperature is higher than a melting point (a softening point).

The fiber bundle F is constituted by a fiber bundle in which around several to tens of thousands of so-called multifilaments are bundled, and each of the multifilaments is formed as one thread by twisting dozens of filaments. The formation of the reinforced layer 14 is performed, for example, by a filament winding apparatus (hereinafter referred to as the FW apparatus) (not shown).

The FW apparatus is a manufacturing apparatus configured to stretch out a thick fiber bundle F such that the thick fiber bundle F is made thinner, add soft twist yarn to the fiber bundle F to form a coarse thread, wind up the coarse thread as a so-called roving (a roving such as a glass roving), and continuously wind the wound up roving around a workpiece while the roving is impregnated with resin or the roving thus impregnated with resin is tensed. With the FW method, the strength of the workpiece in the axial direction and in the circumferential direction can be adjusted by adjusting the winding angle of the roving.

Figure 2:
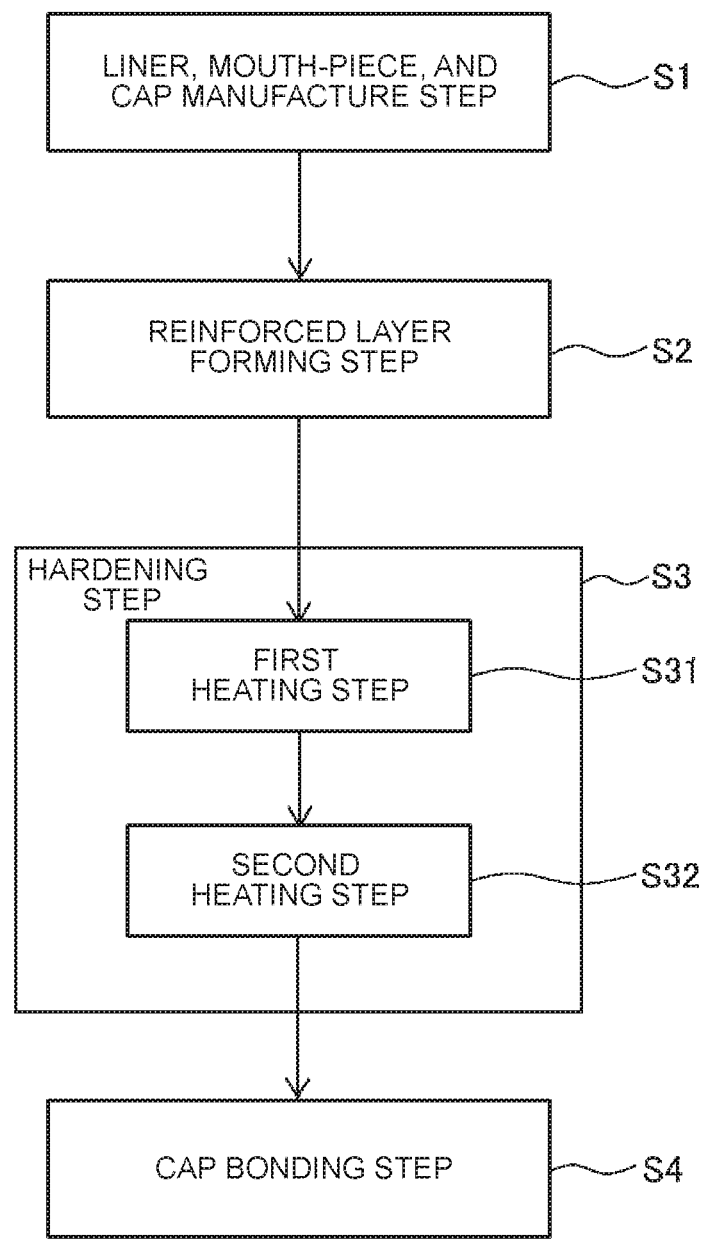
FIG. 2 is a flowchart illustrating a manufacturing method for the high-pressure tank according to one embodiment of the present disclosure.

Next will be described a manufacturing method for the high-pressure tank 10 according to the present embodiment. As illustrated in FIG. 2, the manufacturing method for the high-pressure tank 10 includes a liner, mouth-piece, and cap manufacture step S1, a reinforced layer forming step S2, a hardening step S3, and a cap bonding step S4. The steps are performed sequentially. Note that the hardening step S3 in the present embodiment includes a first heating step S31 and a second heating step S32.

In the liner, mouth-piece, and cap manufacture step S1, the liner 11, the mouth pieces 12, 13, and the caps 15 are manufactured. The liner 11 is divided at the center in the longitudinal direction such that a first liner including the cylinder portion and the dome portion 17 and a second liner including the cylinder portion and the dome portion 17 similarly to the first liner are separately manufactured by molding by use of resin or the like. Further, the mouth pieces 12, 13 are manufactured by metalworking such as metal mold casting or cutting.

Subsequently, the mouth piece 12 is inserted into a through-hole of the first liner thus manufactured, such that the first liner is engaged with the mouth piece 12. Further, the mouth piece 13 is inserted into a through-hole of the second liner thus manufactured, such that the second liner is engaged with the mouth piece 13. Subsequently, a first end portion where the cylinder portion of the first liner to which the mouth piece 12 is attached is opened abuts with a first end portion where the cylinder portion of the second liner to which the mouth piece 13 is attached is opened such that the first end portions of the first liner and the second liner face each other, and the first liner and the second liner are assembled to each other so that their axes are aligned with each other.

The first liner and the second liner thus assembled are joined by a joining method such as laser fusion. The first liner is integrated with the second liner by this joining, and thus, the liner 11 to which the mouth pieces 12, 13 are attached is manufactured.

The caps 15 are manufactured by molding in the same shape as the reinforced layer 14 on the dome portions 17 of the liner 11 as illustrated in FIGS. 1A, 1B by use of shock absorbing resin having a porous structure, e.g., a rubber material such as urethane rubber made of polyurethane (PU), nitrile rubber, or fluororubber. The cap 15 has a through-hole in the center and is configured such that a corresponding one of the mouth pieces 12, 13 is inserted therein at the time when the cap 15 is attached to the reinforced layer 14 on a corresponding one of the dome portions 17.

In the reinforced layer forming step S2, a plurality of bobbins around which respective fiber bundles F are wound is set to the FW apparatus, and the fiber bundles F unwound from the bobbins are set in respective components of the FW apparatus. Then, the FW apparatus operates to form the reinforced layer 14 such that the fiber bundles F are wound around the outer peripheral surface of the liner 11 in a state where a predetermined tensile force is given to the fiber bundles F by the FW apparatus. The FW apparatus includes: support portions configured to support the mouth pieces 12, 13 of the liner 11; a rotational driving portion configured to rotate the liner 11 around the axial center; and a fiber guiding portion configured to send the fiber bundle F to the liner 11. The fiber guiding portion is configured to wind the fiber bundle F around the outer peripheral surface of the liner 11 in collaboration with reciprocation of the fiber bundle F in the axis direction of the liner 11 and rotation of the liner 11.

The fiber guiding portion is configured to control, by a controlling portion (not shown), a moving speed (m/sec) of the fiber bundle F in the axis direction of the liner 11, an angle of the fiber bundle F to the axis of the liner 11, and a rotation speed (rpm) of the liner 11 such that a winding method for winding the fiber bundle F around the liner 11 can be changed to helical winding or hoop winding.

Figure 3A:
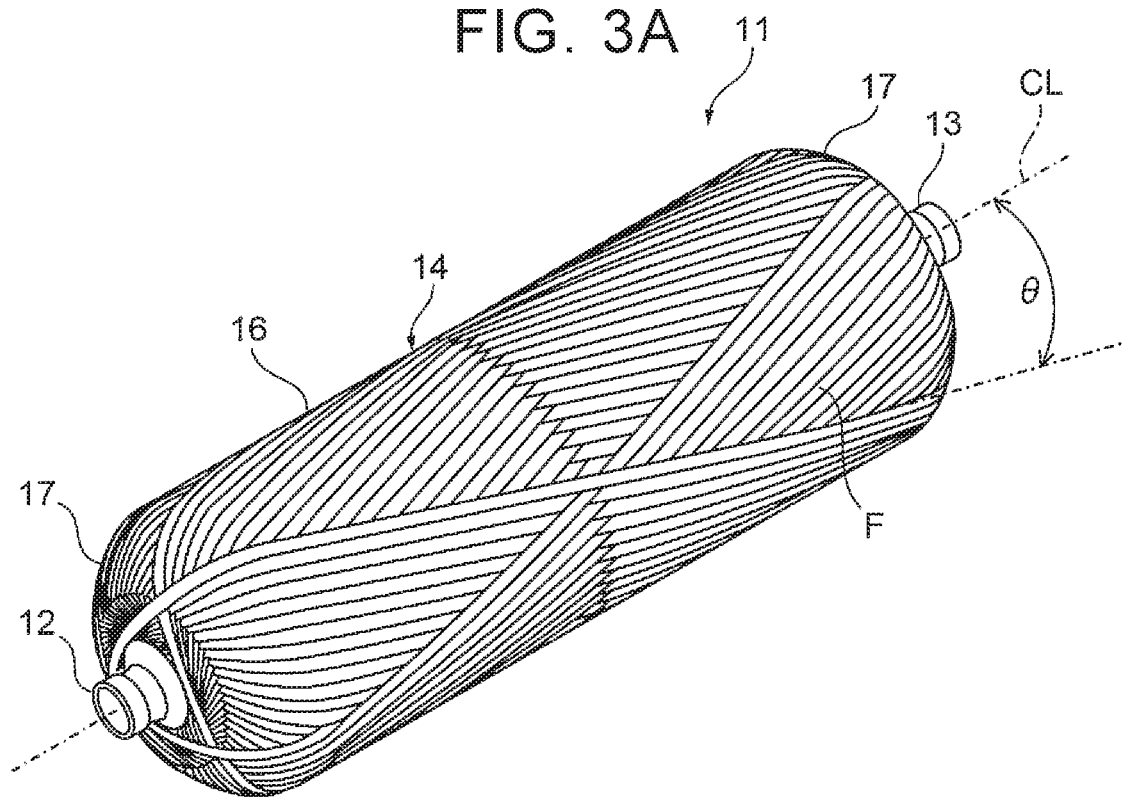
FIG. 3A is a perspective view of the high-pressure tank in which a reinforced layer is formed by the manufacturing method for the high-pressure tank according to one embodiment of the present disclosure and illustrates the reinforced layer an outer peripheral portion of which is formed in helical winding.

As illustrated in FIG. 3A, the helical winding is a winding method in which the fiber bundle F is wound such that its winding locus intersects with an axis CL of the liner 11 at a low angle $\theta$ of around 10° to 30°, for example, and the fiber bundle F is repeatedly wound over the whole cylinder portion 16 and the whole dome portions 17 of the liner 11.

Figure 3B:
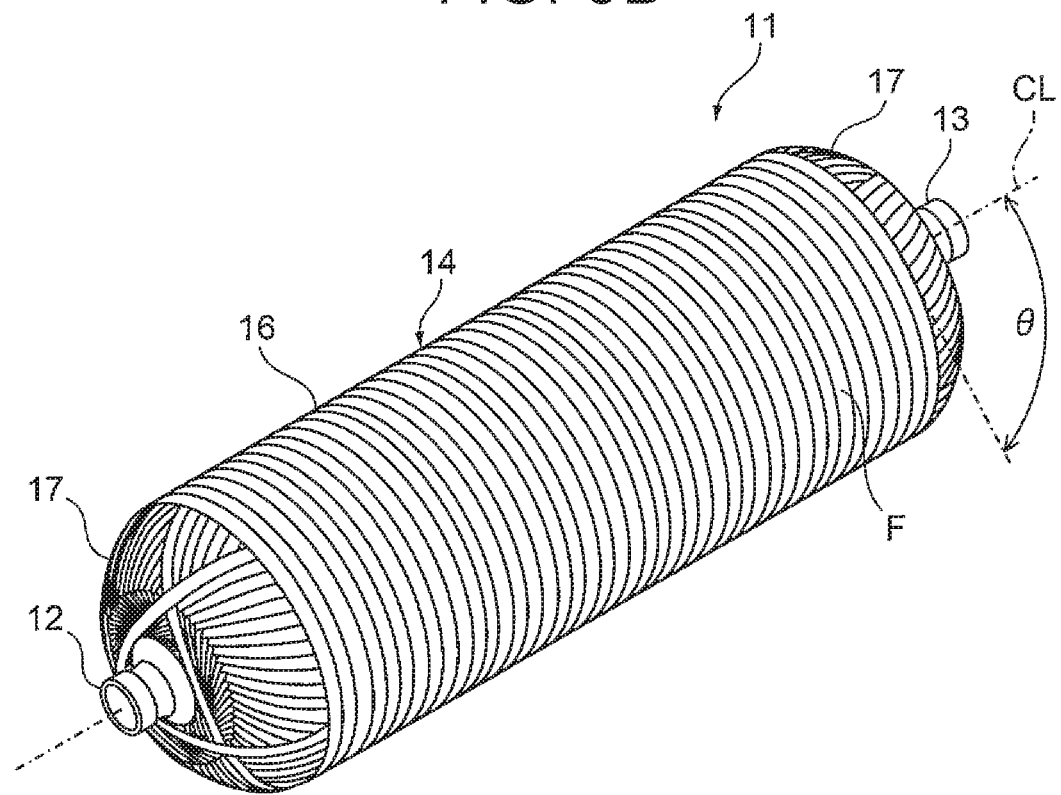
FIG. 3B is a perspective view of the high-pressure tank in which a reinforced layer is formed by the manufacturing method for the high-pressure tank according to one embodiment of the present disclosure and illustrates the reinforced layer an outer peripheral portion of which is formed in hoop winding.

As illustrated in FIG. 3B, the hoop winding is a winding method in which the fiber bundle F is wound such that its winding locus intersects with the axis CL of the liner 11 at an angle of about 90°, for example, that is close to a right angle and the fiber bundle F is repeatedly wound around the outer peripheral surface of the cylinder portion 16 of the liner 11.

When the fiber bundle F is wound around the liner 11 as such, a tank on which the uncured reinforced layer 14 is formed is obtained. That is, the reinforced layer forming step S2 is one example of "a step of preparing a tank" in the present disclosure.

Figure 4:
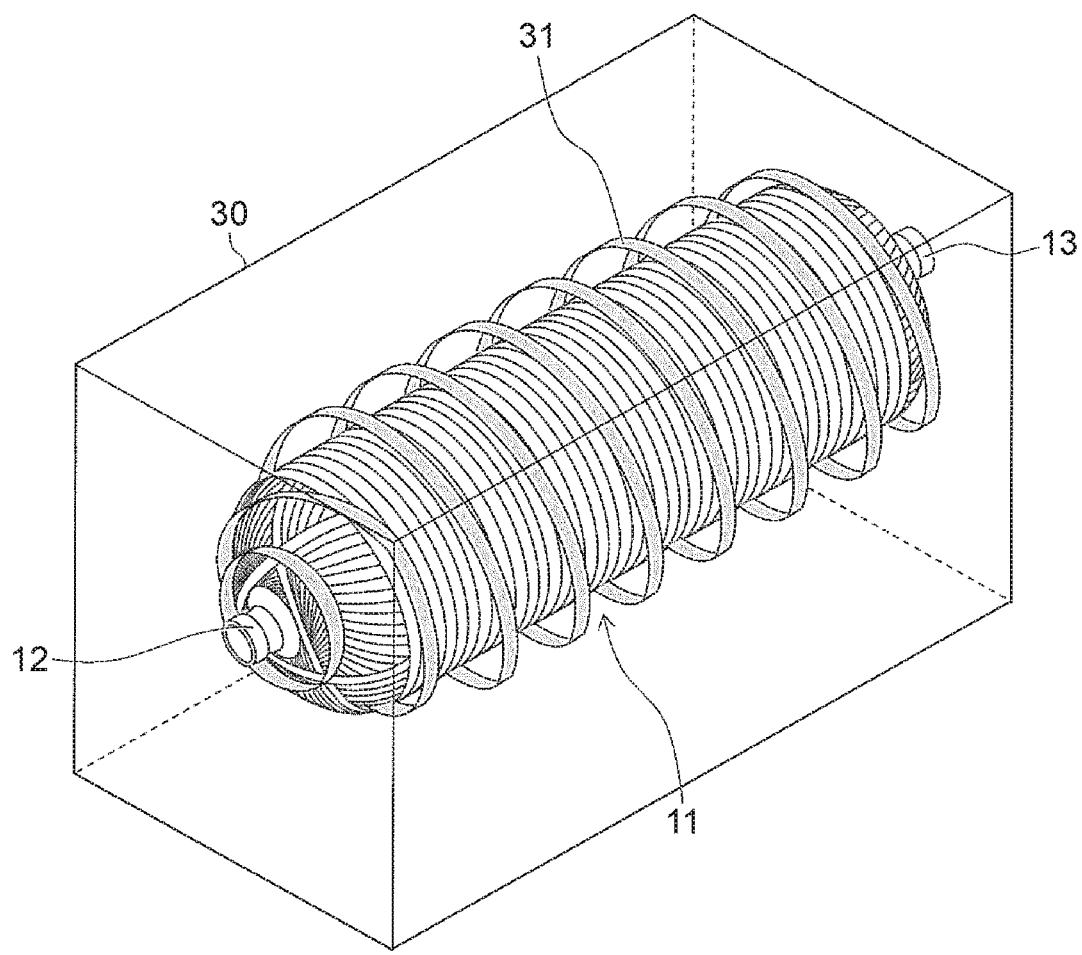
FIG. 4 is a view to describe a hardening step of the manufacturing method for the high-pressure tank according to one embodiment of the present disclosure and is a perspective view illustrating a state where a liner on which the reinforced layer is formed is set in an induction-heating hardening furnace.

In the hardening step S3, a hardening process is performed on the reinforced layer 14 by heating. More specifically, as illustrated in FIG. 4, the liner 11 on which the uncured reinforced layer 14 is formed is set inside an induction-heating hardening furnace 30, and a coil 31 for dielectric heating is placed around the liner 11 in a spiral manner. An induction heating apparatus (not shown) configured to introduce a current to the coil 31 is provided in the induction-heating hardening furnace 30. Further, a noncontact temperature sensor (not shown) configured to measure a surface temperature of the reinforced layer 14 is provided in the induction-heating hardening furnace 30. Note that, in the reinforced layer forming step S2, a thermo-electric couple may be attached to the surface of the reinforced layer 14 or a part near the surface of the reinforced layer 14, so that a temperature of the surface of the reinforced layer 14 or of the part near the surface of the reinforced layer 14 can be measured.

Further, inside the induction-heating hardening furnace 30, the support portions configured to support the mouth pieces 12, 13 of the liner 11 and the rotational driving portion configured to rotate the liner 11 around the axial center are provided, and in the hardening step S3, the reinforced layer 14 is hardened while the liner 11 is rotated.

Here, in the present embodiment, the hardening step S3 includes a first heating step S31 of heating the reinforced layer 14 by introducing a low-frequency current to the coil 31, and a second heating step S32 of heating the reinforced layer 14 by introducing a high-frequency current to the coil 31. Note that, generally, the low-frequency current indicates a current of 5 kHz or less, and the high-frequency current indicates a current of 10 kHz or more. In the present embodiment, the low-frequency current indicates a current of not less than 50 Hz but not more than 5 kHz, for example, and the high-frequency current indicates a current of not less than 10 kHz but not more than 100 kHz, for example.

Figure 5:
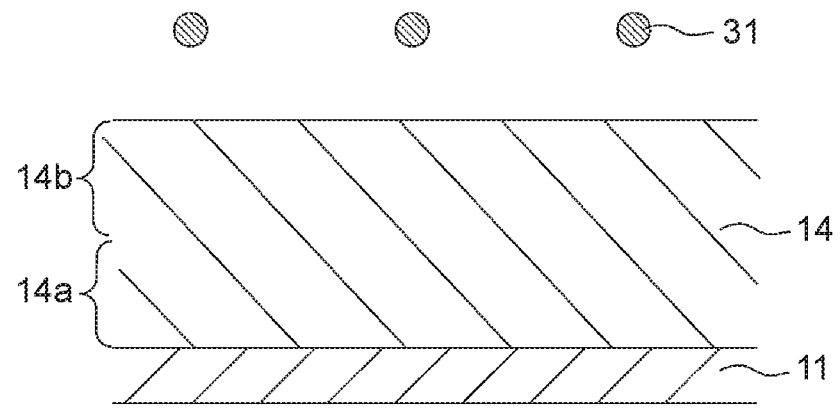
FIG. 5 is an enlarged sectional view illustrating a structure around the reinforced layer and a coil in FIG. 4.

In the first heating step S31, the uncured reinforced layer 14 is heated by low-frequency induction heating, so that the thermosetting resin is softened. In the low-frequency induction heating, an inner layer (a layer close to the liner 11 in the reinforced layer 14) 14a (see FIG. 5) of the reinforced layer 14 is easily heated, so that the temperature of the inner layer 14a rises earlier than an outer layer (a layer close to the surface of the reinforced layer 14) 14b (see FIG. 5) (time t0 to time t1 in FIG. 6). Note that, in FIG. 6, a continuous line indicates an actual value of an outermost layer of the reinforced layer 14 that is measured by the temperature sensor (not shown), and a broken line indicates a predicted value of the temperature of an innermost layer of the reinforced layer 14 that is derived from a relationship between temperature data of the innermost layer of the reinforced layer 14 and temperature data of the outermost layer, those pieces of temperature data being measured in advance.

When the temperature of the inner layer 14a reaches a melting point T1 (see FIG. 6) of the thermosetting resin with which the fiber bundle F is impregnated, the inner layer 14a liquefies and becomes a low viscosity state. After that, the temperature of the outer layer 14b reaches the melting point T1 (see FIG. 6), and the outer layer 14b liquefies and becomes a low viscosity state (time t1 in FIG. 6). In this state, air entering gaps between the fiber bundles F and gas generated from the thermosetting resin in the reinforced layer forming step S2 are gradually released outside from the surface of the reinforced layer 14.

Figure 6:
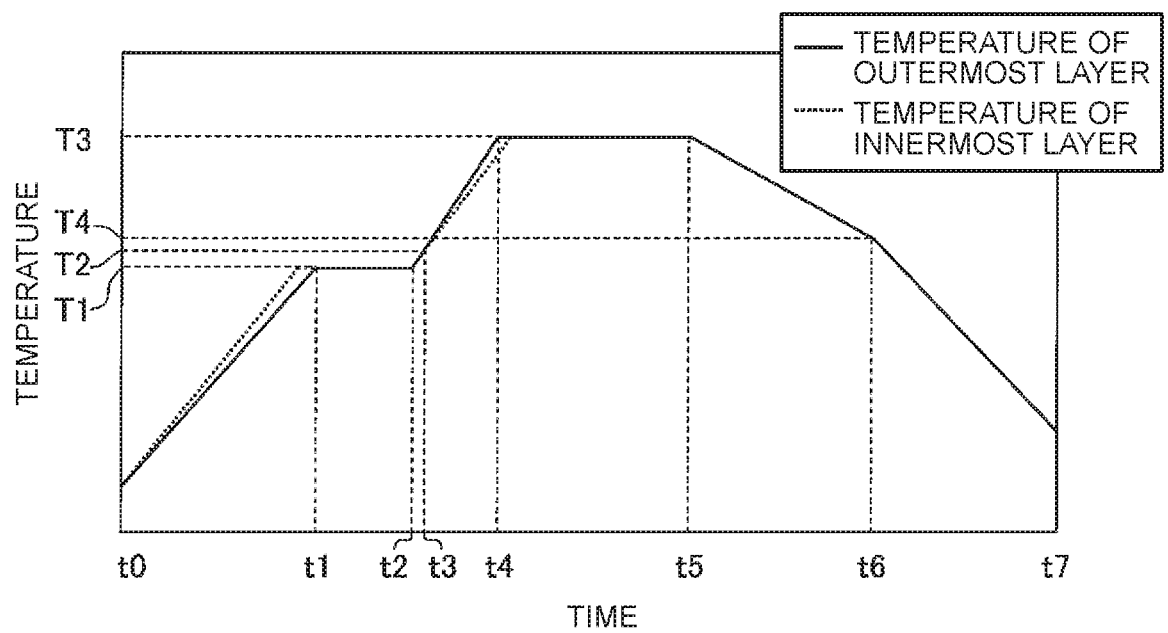
FIG. 6 is a graph showing a relationship between an elapsed time of the hardening step and a temperature in the manufacturing method for the high-pressure tank according to one embodiment of the present disclosure.

In the present embodiment, in order to maintain this state for a predetermined time, when the temperatures of the inner layer 14a and the outer layer 14b of the reinforced layer 14 reach the melting point T1, an on-off control is performed on the induction heating apparatus such that the temperatures of the innermost layer and the outermost layer of the reinforced layer 14 are maintained to be not less than the melting point T1 but less than a hardening starting temperature T2 (see FIG. 6) of the thermosetting resin for a predetermined time (time t1 to time t2 in FIG. 6). Hereby, the air and the gas in the reinforced layer 14 are sufficiently released (discharged) outside, so that voids are hardly formed inside the reinforced layer 14 in the after-mentioned second heating step S32. Note that a time t2−t1 (a maintaining time) changes depending on the type of the thermosetting resin, the winding thickness of the fiber bundle F, or the like (releasability of the air or the void).

After that, the reinforced layer 14 is heated by the low-frequency induction heating until the temperature of the innermost layer of the reinforced layer 14 reaches the hardening starting temperature T2 of the thermosetting resin (time t2 to time t3 in FIG. 6).

Here, in the present embodiment, at a timing when the temperature of the innermost layer of the reinforced layer 14 reaches the hardening starting temperature T2, a high-frequency current of not less than 10 kHz but not more than 100 kHz is introduced to the coil 31, so that the first heating step S31 is switched to the second heating step S32 of heating the reinforced layer 14. That is, at the timing when the temperature of the innermost layer of the reinforced layer 14 reaches the hardening starting temperature T2, the first heating step S31 is switched to the second heating step S32. In the high-frequency induction heating, the outer layer 14b (the outermost layer in particular) is more easily heated than the inner layer 14a, so that the temperature of the outer layer 14b (the outermost layer in particular) rises earlier than the inner layer 14a (time t3 to time t4 in FIG. 6).

After that, the temperatures of the outer layer 14b and the inner layer 14a sequentially reach a hardening temperature T3 (see FIG. 6) of the thermosetting resin, so that the outer layer 14b and the inner layer 14a harden. At this time, since the outer layer 14b (the outermost layer in particular) hardens earlier than the inner layer 14a, it is possible to restrain the thermosetting resin from seeping from the outermost layer of the reinforced layer 14.

By performing an on-off control on current application of the induction heating apparatus, the temperatures of the outermost layer and the innermost layer are maintained at the hardening temperature T3 or more for a predetermined time (time t4 to time t5 in FIG. 6). Hereby, the hardening of the reinforced layer 14 is completed.

After that, by performing the on-off control on current application of the induction heating apparatus, the inner layer 14a and the outer layer 14b are cooled so that the temperatures slowly decrease from the hardening temperature T3 to a glass transition temperature T4 (see FIG. 6) of the thermosetting resin (t5 to t6 in FIG. 6). During the slow cooling from the hardening temperature T3 to the glass transition temperature T4, a relationship between the elapsed time and the temperature is managed so that the slow cooling does not adversely affect quality.

Then, the reinforced layer 14 is cooled rapidly by turning off the induction heating apparatus and performing air-cooling by use of a cold blast (t6 to t7 in FIG. 6). The rapid cooling decreases the temperatures at a speed faster than the slow cooling speed, thereby shortening a cooldown time. Since the cooling speed does not adversely affect quality, the reinforced layer 14 is cooled as fast as possible.

In the cap bonding step S4, an adhesive (not shown) is applied to respective inner peripheral surfaces (surfaces making contact with the reinforced layer 14) of the caps 15. The adhesive is a moisture curable adhesive that hardens by reacting with moisture in the air and is made of, for example, a cyanoacrylate based adhesive, a silicone rubber based adhesive, or modified acrylic silicone. Then, the caps 15 are attached to the reinforced layer 14 on the dome portions 17 of the liner 11, and the caps 15 are held under pressure against the reinforced layer 14 by a pressure holding mechanism (not shown).

Hereby, the caps 15 are bonded to the reinforced layer 14 via the adhesive.

The high-pressure tank 10 is manufactured as stated above.

In the present embodiment, as described above, the first heating step S31 of heating the uncured reinforced layer 14 by low-frequency induction heating so that the thermosetting resin is softened is provided. In a case where the reinforced layer 14 is heated by the low-frequency induction heating as such, the inner layer 14a of the reinforced layer 14 is easily heated. This allows the air and the gas in the inner layer 14a of the reinforced layer 14 to be easily released outside the reinforced layer 14. As a result, it is possible to restrain voids from being formed inside the reinforced layer 14, thereby making it possible to restrain a poor appearance and a decrease in quality. Note that, when the uncured reinforced layer 14 is heated only by the high-frequency induction heating without the low-frequency induction heating after the step (the reinforced layer forming step S2 in this embodiment) of preparing the tank, the outermost layer of the reinforced layer 14 hardens first, so that the air and the gas in the inner layer 14a are hard to be released outside, thereby resulting in that voids are formed inside the reinforced layer 14.

Further, the second heating step S32 of heating the softened reinforced layer 14 by the high-frequency induction heating so that the reinforced layer 14 is hardened is provided after the first heating step S31. In a case where the reinforced layer 14 is heated by the high-frequency induction heating as such, the outer layer 14b (the outermost layer in particular) of the reinforced layer 14 is easily heated. Accordingly, the outer layer 14b (the outermost layer in particular) of the reinforced layer 14 can be hardened earlier than the inner layer 14a, thereby making it possible to restrain the thermosetting resin from seeping from the outermost layer of the reinforced layer 14. As a result, it is possible to restrain variations in the volume fraction of fiber of the reinforced layer 14 and to restrain a strength reduction in the high-pressure tank 10 due to an increase in the volume fraction of fiber. Note that, in a case where the reinforced layer 14 is hardened by heating the reinforced layer 14 by the low-frequency induction heating, a timing for the outer layer 14b of the reinforced layer 14 to harden delays (the outer layer 14b of the reinforced layer 14 does not harden earlier than the inner layer 14a) in comparison with a case where the reinforced layer 14 is hardened by heating the reinforced layer 14 by the high-frequency induction heating. Consequently, the amount of the thermosetting resin seeping from the outermost layer of the reinforced layer 14 increases.

Further, as described above, at the timing when the innermost layer of the reinforced layer 14 reaches the hardening starting temperature T2, the first heating step S31 is switched to the second heating step S32. When the first heating step S31 is performed by the low-frequency induction heating until the innermost layer of the reinforced layer 14 reaches the hardening starting temperature T2, the air and the gas in the inner layer 14a of the reinforced layer 14 can be further easily released outside the reinforced layer 14. Further, by performing the second heating step S32 by the high-frequency induction heating at the timing when the innermost layer of the reinforced layer 14 reaches the hardening starting temperature T2, it is possible to restrain the thermosetting resin from seeping from the outermost layer of the reinforced layer 14. As described above, while the thermosetting resin is restrained from seeping, the air and the gas in the inner layer 14a of the reinforced layer 14 can be further easily released.

Further, as described above, in the first heating step S31, the innermost layer and the outermost layer of the reinforced layer 14 are maintained at a temperature of not less than the melting point T1 of the thermosetting resin but less than the hardening starting temperature T2 for a predetermined time. This makes it possible to maintain the innermost layer and the outermost layer of the reinforced layer 14 in a low viscosity state for the predetermined time, thereby making it possible to surely release the air and the gas in the reinforced layer 14 to outside. As a result, it is possible to further restrain voids from being formed inside the reinforced layer 14.

Note that it should be considered that the embodiment disclosed herein is just an example in all respects and is not limitative. The scope of the present disclosure is shown by Claims, not by the descriptions of the above embodiment, and is intended to include every modification made within the meaning and scope equivalent to Claims.

For example, the above embodiment describes the high-pressure tank 10 into which high-pressure gas is filled and the manufacturing method for the high-pressure tank 10. However, the present disclosure is not limited to this. For example, the present disclosure may be applied to a manufacturing method for a tank into which liquid hydrogen or the like except the high-pressure gas is filled, for example.

Further, the above embodiment describes an example in which the low-frequency induction heating is performed from the melting point T1 to the hardening starting temperature T2 (that is, from time t2 to time t3). However, the present disclosure is not limited to this. For example, the low-frequency induction heating may be switched to the high-frequency induction heating at time t2, and the high-frequency induction heating may be performed from the melting point T1 to the hardening temperature T3 (that is, from time t2 to time t4).

Further, the above embodiment describes an example in which the temperature of the innermost layer of the reinforced layer 14 is not actually measured in the manufacturing method for the high-pressure tank 10. However, the present disclosure is not limited to this, and the temperature of the innermost layer of the reinforced layer 14 may be actually measured.

What is claimed is:

1. A manufacturing method for a tank including a fiber reinforced resin layer formed such that an electrically conductive fiber bundle impregnated with thermosetting resin is wound around a liner, the manufacturing method comprising:
    a step of preparing the tank in which the uncured fiber reinforced resin layer is formed on the liner;
    a first heating step of heating the uncured fiber reinforced resin layer by placing a coil for dielectric heating around the liner in a spiral manner and introducing a low-frequency current to the coil for low-frequency induction heating so that the thermosetting resin is softened; and
    a second heating step of, after the first heating step, heating the softened fiber reinforced resin layer by introducing a high-frequency current to the coil for high-frequency induction heating so that the fiber reinforced resin layer is hardened.

2. The manufacturing method according to claim 1, wherein the first heating step is switched to the second heating step at a timing when an innermost layer of the fiber reinforced resin layer reaches a hardening starting temperature.

3. The manufacturing method according to claim 1, wherein, in the first heating step, an innermost layer and an outermost layer of the fiber reinforced resin layer are maintained at a temperature of not less than a melting point of the thermosetting resin but less than a hardening starting temperature for a predetermined time.

4. The manufacturing method according to claim 1, wherein during the first heating step gas is permitted to be expelled from uncured fiber reinforced resin.

* * * * *